Jan. 6, 1970

S. YANDO 3,488,615

MAGNETIC MATRIX DEFINING PAIRS OF OPPOSITELY POLED
PERMANENT MAGNETS

Original Filed Feb. 3, 1966

INVENTOR.
STEPHEN YANDO

BY R. J. Frank
ATTORNEY.

INVENTOR.
STEPHEN YANDO
BY R. J. Frank
ATTORNEY

INVENTOR.
STEPHEN YANDO
BY R. J. Frank
ATTORNEY.

United States Patent Office 3,488,615
Patented Jan. 6, 1970

3,488,615
MAGNETIC MATRIX DEFINING PAIRS OF OP-
POSITELY POLED PERMANENT MAGNETS
Stephen Yando, Huntington, N.Y., assignor to General
Telephone and Electronics Laboratories, Inc., a corporation of Delaware
Original application Feb. 3, 1966, Ser. No. 524,718, now
Patent No. 3,439,416, dated Apr. 22, 1969. Divided and
this application Nov. 21, 1968, Ser. No. 796,627
Int. Cl. H01f 7/20
U.S. Cl. 335—285                                    3 Claims

ABSTRACT OF THE DISCLOSURE

A magnetic matrix defining pairs of oppositely poled permanent magnets with interposed magnetic spacers and non-magnetic laminations adjacently positioned between said pairs of magnets. The matrix is also formed with channels in one surface thereof and notches in the magnetic spacers, whereby an external magnetic field of each magnet pair is established at the aforementioned surface.

---

This is a division of application Ser. No. 524,718 filed Feb. 3, 1966, now Patent No. 3,439,426.

This invention relates to the fabrication of an array of discrete elements and more particularly to a method and apparatus for fabricating a planar array of discrete elements.

The present interest in compact electrical circuits has resulted in a substantial reduction in size in many types of electrical circuits, notably those circuits generally referred to as microminiature circuits. In addition, considerable time and effort have been expended on devising methods of making components of a size suitable for use in microminiature circuits. While these methods have resulted in considerable reduction of component size to a point where the dimensions of circuit elements are expressed in thousandths of an inch, the individual handling, location and orientation of a large number of these circuit elements is difficult.

Accordingly, an object of this invention is to provide an improved method of fabricating an array of discrete elements.

Another object is to provide a method for precisely locating a multiplicity of discrete elements in an array.

A further object is to provide a method for locating and orienting a multiplicity of discrete elements in an array.

Still another object is to provide improved apparatus for fabricating an array of discrete elements.

Briefly stated, this invention is a method of fabricating a planar array of discrete elements in which the individual elements are precisely located and oriented in a predetermined manner.

The method employs a matrix containing a plurality of pairs of spaced oppositely poled magnets. Each pair of magnets produces an external magnetic field proximate to a surface of the matrix. The individual elements are provided with a magnetic coating on at least one surface. The elements are then placed on the surface of the matrix without regard to their desired location and orientation. When the matrix is vibrated, motion is imparted to the elements and the elements move freely on the surface of the matrix until they enter the external magnetic fields.

At this point, an element entering the magnetic field provided by a pair of oppositely poled magnets is, in effect, captured by the magnet pair since the external field favors the low reluctance path provided by the magnetic coating on the element. This low reluctance path associated with an element substantially eliminates the external field at the corresponding magnet pair so that only one element is captured by each pair. In this manner, each element is precisely located on the matrix surface at a point overlying a pair of oppositely poled magnets. In addition, the elements are oriented in a predetermined manner since each external magnetic field causes the corresponding element to be positioned such that its magnetic coating is adjacent the pole faces of the magnets, i.e., the surface of the matrix.

Further features and advantages of the above invention will become more readily apparent from the following detailed description of a specific embodiment when viewed in conjunction with the accompanying drawings, in which.

Figure 1:
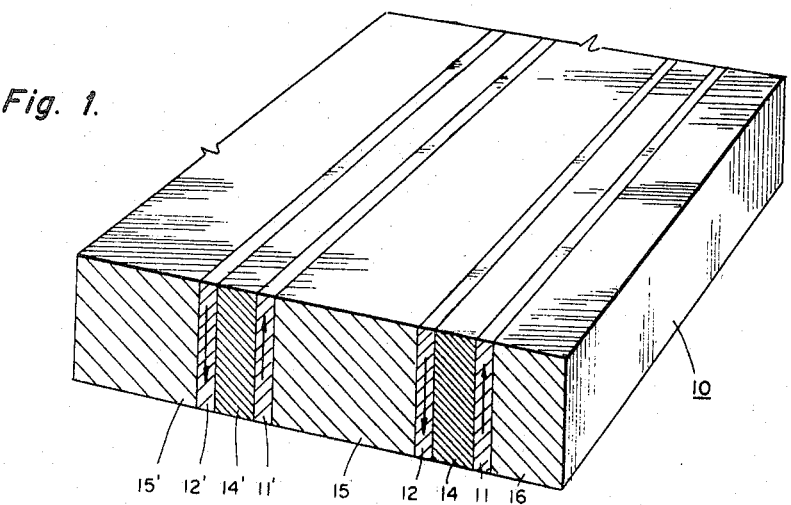
FIG. 1 is a view in perspective of a laminated base employed in fabricating a magnetic matrix.
Figure 2:
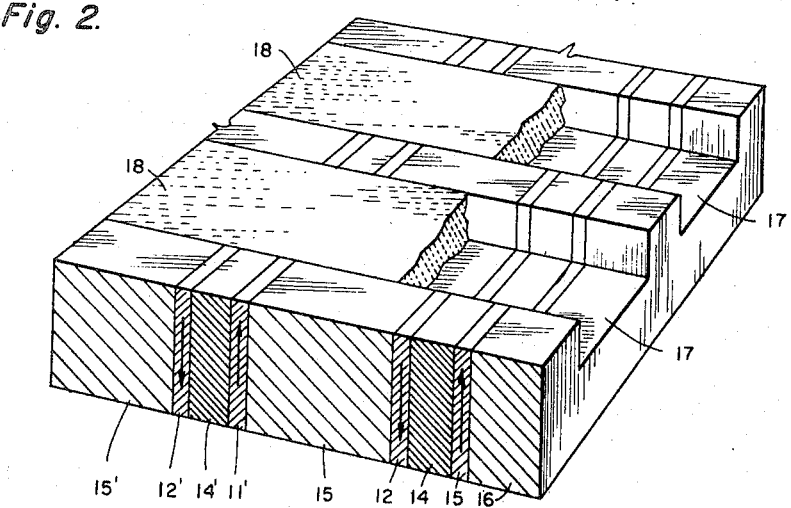
FIG. 2 is a view in perspective showing a partially fabricated matrix.
Figure 3:
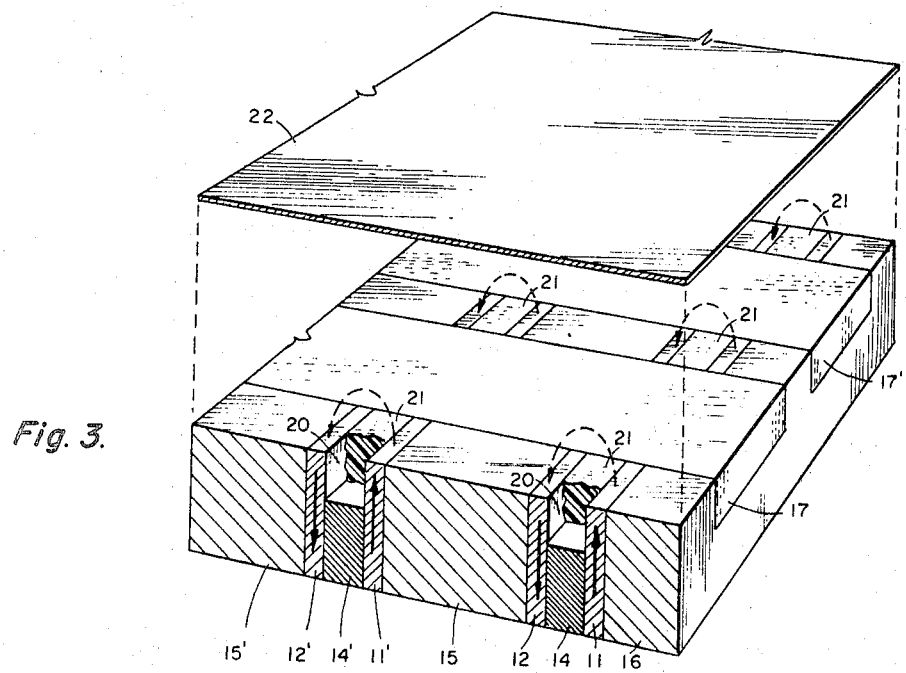
FIG. 3 is a view in perspective showing a fabricated matrix.

In accordance with the present invention, a matrix containing a plurality of spaced oppositely poled magnets is employed to locate and orient the discrete elements. Referring to FIGS 1–3, the fabrication of this matrix is shown as comprising a plurality of steps.

Initially, a laminated base 10 is formed containing a plurality of groups of laminations. Each group contains first and second permanent magnets 11, 12, a magnetic spacer 14 interposed therebetween, and a non-magnetic lamination 15 adjacent the second permanent magnet 12. The permanent magnets 11, 12 are poled in opposite directions as shown by the arrows of FIG. 1 and are formed of a material having a strong coercive force such as platinum-cobalt alloy or the like. The magnetic spacer may be formed of iron and the lamination 15 may be formed of stainless steel. In addition, a non-magnetic lamination 16 may be located adjacent first magnet 11. As shown, the group is repetitive along one direction of the base. The laminations are bonded together by epoxy or the like to form an integral structure.

A plurality of channels 18 are then formed in a large area surface of the laminated base. The channels, which may be formed by conventional machining techniques, are transverse to the laminations so that a matrix comprising a plurality of pairs of oppositely poled magnets are formed. The channels are filled with a hard, non-magnetic filler, for example, a silica-filled resin such as Shell Epon 815 Agent D catalyst with fine silica added. Although a magnetic matrix is formed, substantially no external magnetic field is present at the surface of the matrix since the magnetic spacer 14 between each pair of magnets provides a low reluctance path therebetween.

Next, as shown in FIG. 3, a portion of the spacer 14 adjacent the matrix surface is removed, for example, by controlled etching to form notches 20. In the case of iron spacers, the etchant may be nitric acid. By removing a portion of the iron spacer, an external magnetic field, shown by the dashed lines, is established at each pair of magnets. The spacing of the magnet pairs and the corresponding external fields in the direction transverse to the laminations is determined by the width of the non-magnetic laminations 15. The spacing in the direction parallel to that of the laminations is determined by the width of the channels 17. In practice, this spacing is made substantially larger, for example, ten times, than the spacing between the individual magnets in a pair. As a result, the external magnetic fields are substantially confined to the location of each magnet pair. The notches 20 are filled with a hard non-magnetic material, for example, a resin such as Shell Epon 815, Agent D catalyst, so that a uniform matrix surface is provided. The strength of the individual magnetic fields is determined by the depth of the notches for a given material and a given magnet spacing. The depth of the notches 20 should be uniform throughout the matrix such that the external field at the magnet pairs is constant regardless of the location of the pair in the matrix. In one embodiment wherein the width of each magnet was 0.5 mil and the width of the spacer was 2 mils, the notches were etched to a depth of 2 mils.

Figure 4:
FIG. 4 is a view in perspective of a typical element to be incorporated in an array.

A typical element 24 to be incorporated in the fabricated array is shown in FIG. 4. The element, which may be a diode or a single crystal semiconductor die, is provided with a magnetic coating 23, such as iron having a typical thickness of 0.5 mil, on one surface thereof. Although only one surface of the element is coated, in arrays wherein the orientation of the elements is unimportant additional surfaces may be coated. While the magnetic coating of the surface of the element may be utilized as one electrode thereof, in practice, it has been found desirable to provide a non-magnetic conductive layer 22 having a thickness, for example of 0.1 mil, on the surface of the matrix. This layer provides a continuous bottom electrode for the fabricated array.

A multiplicity of elements is placed on the surface of the matrix without regard to location or orientation. The matrix is then vibrated to impart rotation to the elements which move freely about the matrix surface until each comes under the influence of an external magnetic field. When an element enters the field established by a magnet pair, the effect of the field is to attract the magnetic coated surface of the element toward the pole faces of the magnets. The element is then, in effect, captured by the field and oriented thereby so that its magnetic coating is adjacent the pole faces of the magnets and establishes a low reluctance path therebetween. This low reluctance path removes any external field at this magnet pair and thereby insures that only one element is located at each pair.

Figure 5:
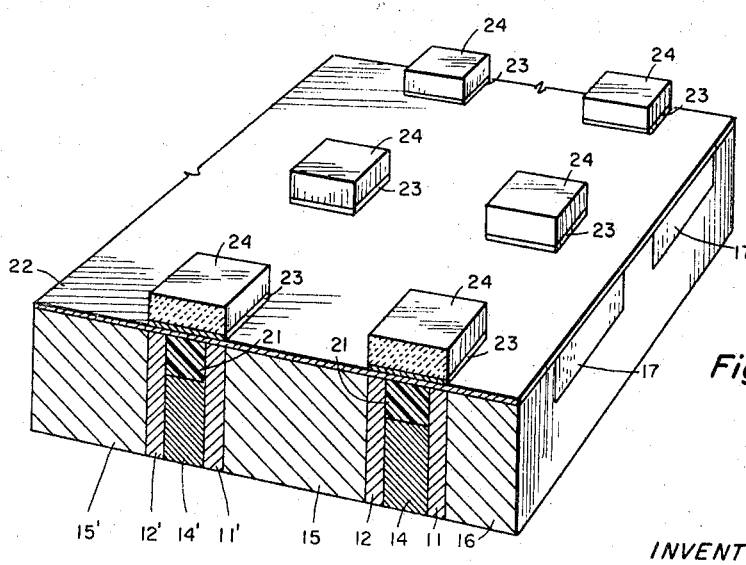
FIG. 5 is a view in perspective of the matrix of FIG. 1 having a plurality of oriented elements located thereon.

The resultant location and orientation of the elements are shown in FIG. 5. It will be noted that the combined width of the notch 20 and the adjacent magnets is substantially equal to the width of the coated surface of the elements. This enables the external field produced by each magnet pair to be eliminated due to the low reluctance path provided by the magnetic coating 23. In practice, the combined width is made somewhat less than the width of the coated surface of the elements to insure that a single element eliminates the corresponding external field. For example, the combined width was selected to be about 3 mils for elements having a width of 4 mils. In addition, the use of a single coating 23 enables the polarity of the positioned elements to be uniform throughout. This is found useful where a number of diodes are to be incorporated in an array.

When the elements are oriented and located as shown in FIG. 5 and any excess elements have been removed, a layer of nonconductive bonding agent 25 having a thickness substantially equal to the height of the arrayed elements is placed on the exposed surface of the elements. The layer 25, as shown in FIG. 6, covers the entire matrix surface.

Next, pressure is applied to the exposed surface of the layer 25. The pressure is nonuniformly applied with the points of maximum pressure being in substantial registration with the top surfaces of the elements 24. As a result, the bonding agent is distributed between the elements 24 and the top surfaces of the elements are exposed. In the case of a thermosetting resin layer 25 such as Shell Epon 828, Agent D catalyst, pressure of about 10 p.s.i. is applied prior to the curing of the resin. In this case, the resin was cured by heating to 100° C. for 30 minutes. However layer 25 may be formed of a thermoplastic bonding agent such as polyethylene, in which case heat of about 150° C. is applied concurrently with a pressure of about 10 p.s.i. to enable the layer to yield under pressure.

Figure 6:
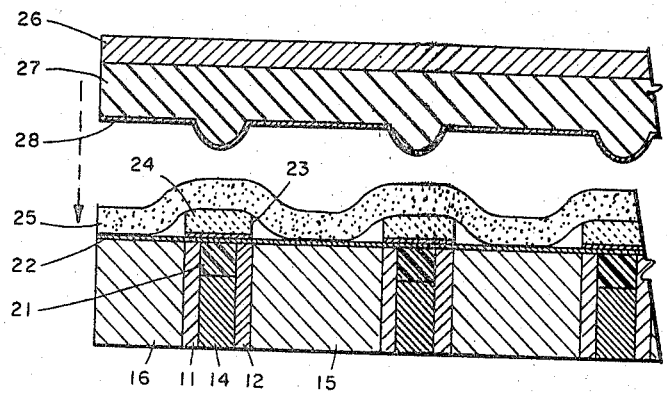
FIG. 6 is a side view of FIG. 4 showing the forming of an array.

The pressure is applied to layer 25, as indicated in FIG. 6, wherein a non-uniform resilient pad 27 is shown affixed to a rigid backing plate 26. The non-uniformities on the lower surface of pad 27 are in substantial registration with the top surfaces of elements 24. In addition, a thin layer of conducting material 28, such as silver foil having a thickness of 0.1 mil, is pressed over and removably adheres to the surface of pad 27. The pad is pressed against the elements on the matrix so that the bonding agent flows between the elements and the silver foil is secured to the top surface of each element. The use of a thermoplastic bonding agent to insure that layers 28 and 22 do not contact each other is preferred since its yielding and resultant flow characteristics may be readily controlled during the application of the pressure.

Figure 7:
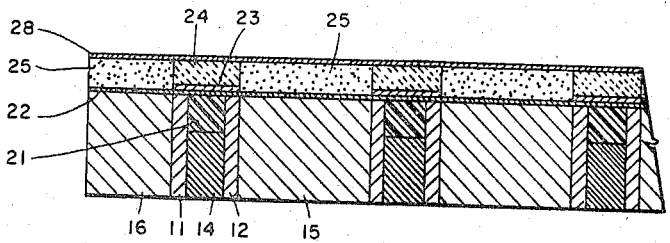
FIG. 7 is a side view of a formed array on the matrix.
Figure 8:
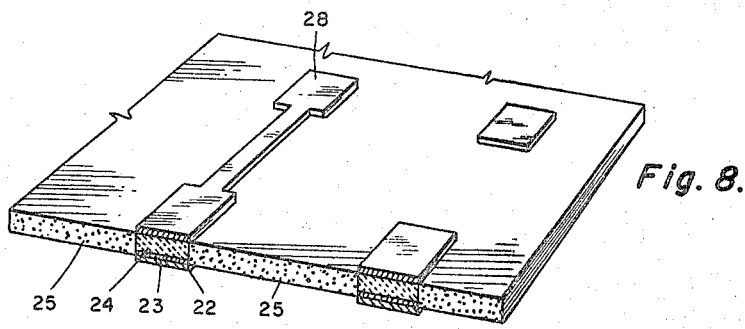
FIG. 8 is a view in perspective of a completed array after removal of the matrix and etching.

The pad 27 is then removed and the resultant structure is shown in FIG. 7 wherein each element is contained in an integral structure by the adjacent bonding material and is provided with top and bottom electrodes comprised of layers 28 and 22 respectively. The matrix is then removed and the top and bottom surfaces of the fabricated array of elements are selectively etched by graphic art techniques to remove unwanted portions of the conductors. The completed array is shown in FIG. 8 wherein two elements are interconnected by their top electrodes and the remainder are electrically isolated by the etching. Although the conducting layer 28 is described above as being applied by pad 27, it will be noted that the conducting layer may be deposited subsequent to the application of pressure by conventional deposition techniques if desired.

While the above description has referred to a preferred embodiment of the invention, it will be recognized that many modifications and variations may be made therein without departing from the spirit and scope of the invention.

What is claimed is:

1. A magnetic matrix for forming an array of discrete elements, each element having a magnetic coating on at least one surface thereof, comprising:
   (a) a plurality of first and second permanent magnetic laminations, said laminations being oppositely poled;
   (b) a plurality of magnetic spacers, each of said spacers being interposed between a first and a second magnetic lamination;
   (c) a plurality of non-magnetic laminations, each of said non-magnetic laminations being adjacently positioned between a second and a first magnetic lamination, said laminations and spacers being bonded together to form an integral structure having a first large area surface;
   (d) a plurality of spaced channels formed in said first surface, said channels being formed transverse to said laminations, said channels forming a matrix of magnet pairs, each magnet pair comprising a portion of said first and second laminations; and (e) a plurality of notches formed in said first surface, each of said notches being formed in the magnetic spacer between said magnet pairs, said notches establishing an external magnetic field at each magnet pair proximate to said first surface.

2. Apparatus in accordance with claim 1 further comprising a non-magnetic filler formed in said channels and notches.

3. Apparatus in accordance with claim 2 in which the combined width of said first and second magnets and said magnetic spacer and the spacing between said channels is at least as small as the width of the coated surface of said elements.

References Cited
UNITED STATES PATENTS 3,078,565  2/1963  Sanders _____ 335—286 XR
3,228,133  1/1966  Baermann _____ 335—285 XR G. HARRIS, Primary Examiner U.S. Cl. X.R.
335—306